United States Patent
Ruotsala

(10) Patent No.: US 8,664,527 B2
(45) Date of Patent: Mar. 4, 2014

(54) CABLE INTERFACE FURNITURE FOR A CONFERENCE TABLE

(75) Inventor: Rami Ruotsala, Nummela (FI)

(73) Assignee: Presson Oy, Espoo (FI)

( * ) Notice: Subject to any disclaimer, the term of this patent is extended or adjusted under 35 U.S.C. 154(b) by 107 days.

(21) Appl. No.: 13/263,041

(22) PCT Filed: Apr. 6, 2010

(86) PCT No.: PCT/FI2010/050267
§ 371 (c)(1),
(2), (4) Date: Dec. 19, 2011

(87) PCT Pub. No.: WO2010/116033
PCT Pub. Date: Oct. 14, 2010

(65) Prior Publication Data
US 2012/0097418 A1    Apr. 26, 2012

(30) Foreign Application Priority Data
Apr. 6, 2009    (FI) ..................................... 20095372

(51) Int. Cl.
*H01R 13/46*    (2006.01)

(52) U.S. Cl.
USPC .................. 174/60; 174/50; 174/59; 220/3.3; 220/4.02; 52/220.1; 312/223.1

(58) Field of Classification Search
USPC ........... 174/480, 481, 482, 494, 500, 50, 559, 174/58, 60, 64, 59; 220/3.2–3.9, 4.02; 52/220.1, 220.3, 220.5, 220.7; 312/223.1, 223.6, 223.2
See application file for complete search history.

(56) References Cited

U.S. PATENT DOCUMENTS

| | | | | |
|---|---|---|---|---|
| 4,792,881 A | * | 12/1988 | Wilson et al. | 312/223.6 |
| 5,231,562 A | * | 7/1993 | Pierce et al. | 174/500 |
| 5,548,086 A | * | 8/1996 | Greenfield et al. | 174/59 |
| 6,017,228 A | | 1/2000 | Verbeek et al. | |
| 6,024,599 A | * | 2/2000 | Stathis et al. | 174/480 |
| 6,028,267 A | * | 2/2000 | Byrne | 174/59 |
| 6,359,217 B1 | * | 3/2002 | Thompson et al. | 174/50 |
| 7,312,393 B2 | * | 12/2007 | McCarthy | 174/500 |
| 7,417,850 B1 | | 8/2008 | Pulido | |
| 2005/0268823 A1 | * | 12/2005 | Bakker et al. | 108/50.02 |
| 2006/0042520 A1 | | 3/2006 | Stevens et al. | |

FOREIGN PATENT DOCUMENTS

| | | |
|---|---|---|
| EP | 0283016 A1 | 9/1988 |
| EP | 0 917 841 A2 | 5/1999 |
| GB | 2 444 791 A | 6/2008 |
| GB | 2444791 A | 6/2008 |
| JP | 2006-81786 A | 3/2006 |

* cited by examiner

*Primary Examiner* — Angel R Estrada
(74) *Attorney, Agent, or Firm* — Birch, Stewart, Kolasch & Birch, LLP.

(57) ABSTRACT

The object of the invention is a cable interface furniture for a conference table, which cable interface furniture comprises at least a space enabling connections that is disposed below an openable and closable table hatch in the table. The cable interface furniture comprises a casing extending from the bottom upwards that is intended to be placed under and that stands on the floor resting on support means that are adjustable in their height, the top part of which casing contains a bed provided with at least lead-in apertures, above which is a space enabling connections, with at least the connectors of the connecting cables being supported in which bed, and which connecting cables are fitted when free to be disposed in the space below the intermediate bed in the casing.

19 Claims, 4 Drawing Sheets

CABLE INTERFACE FURNITURE FOR A CONFERENCE TABLE

Figure 1:
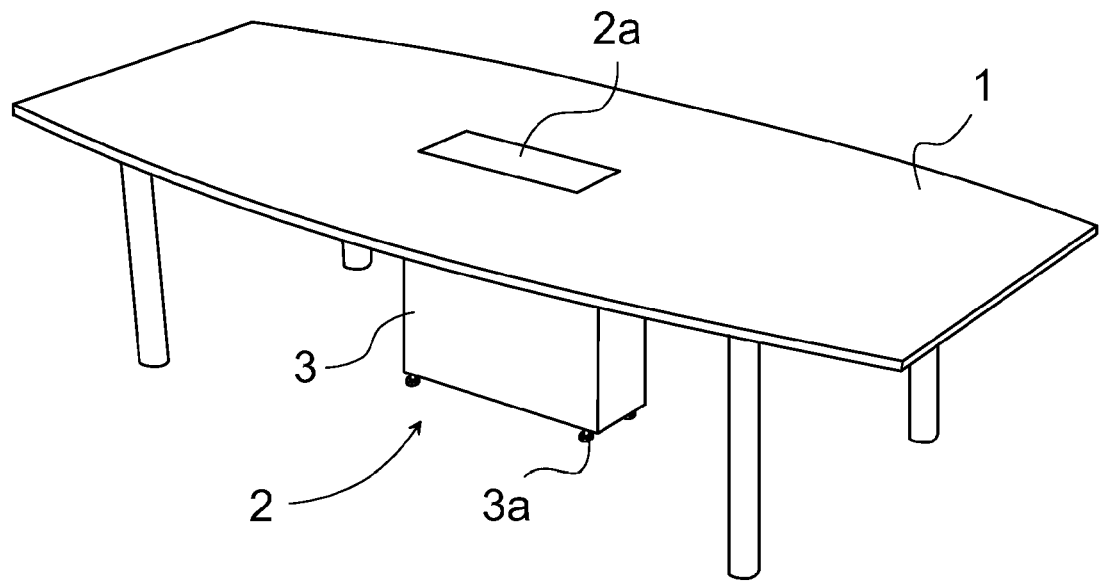

The object of the present invention is a cable interface furniture for a conference table as defined in the preamble of claim 1.

The tables of conference rooms and meeting rooms are often provided with furniture, with which the connection of a computer to a network or to a display apparatus in the meeting room is possible. Often this kind of possibility is made integrated into the conference room table, in a connection means provided with an openable lid, i.e. a table hatch, which is also called a cable cubby, but in fact is rather a shallow box or trough. This type of connection box generally contains connectors for connecting leads to a computer or to other needed devices. Very often the connecting leads are left ready under the lid in the connection box for the next user. One problem is, however, that many connecting leads are crammed back into the connection box after use and the next user often encounters a messy tangle of different leads, from which it is difficult to find the right connecting lead for each situation.

Another problem is that connection boxes integrated into a conference table always belong to one specific table type. One such structure integrated into a table is presented in the USA patent no. US2005/0268823 A1. In this case tables easily become expensive and massive, and they might be difficult to fit into conference rooms or to later move into some other room.

The aim of this invention is to eliminate the aforementioned drawbacks and to achieve a simple and low-cost cable interface furniture for a conference table, i.e. a conference table junction box, in which the connection cables and leads used do not get mixed up and which is always immediately ready-to-use for the next user. The aim is also to achieve a separate, table junction box to be disposed between the floor and the table, which can easily be installed also under numerous conference tables and can be fitted for joint use with the table of a conference room. The cable interface furniture for a conference table, i.e. the table junction box, according to the invention is characterized by what is disclosed in the characterization part of claim 1. Other embodiments of the invention are characterized by what is disclosed in the other claims.

The solution of the invention has the advantage that, owing to its adaptor pieces, the furniture according to the invention is suited for installing in connection with numerous conference tables, provided with different table hatches, below the table. Another advantage is that, owing to its adaptor pieces, the furniture is very versatile, in which case the furniture can also easily be duplicated. By means of the solution according to the invention, a conference table and the space under the table stay tidy and in order, and it is easy for the next user to make the necessary connections. Another advantage is that tidiness and the good order of the cables add efficiency to the starting of conferences and meetings, because the cables and the necessary controllers or regulators are always easily found in order and from the same place. Another advantage is that the furniture according to the invention can be installed in connection with a new or an old conference table. Yet another advantage is that the furniture according to the invention resolves the practical placement of the cables on the table of a conference room for keeping the table clean. A further advantage is that the furniture according to the invention is adjustable, by the aid of its support means that rests on the floor, to a suitable height in relation to the height of the conference table.

Figure 2:
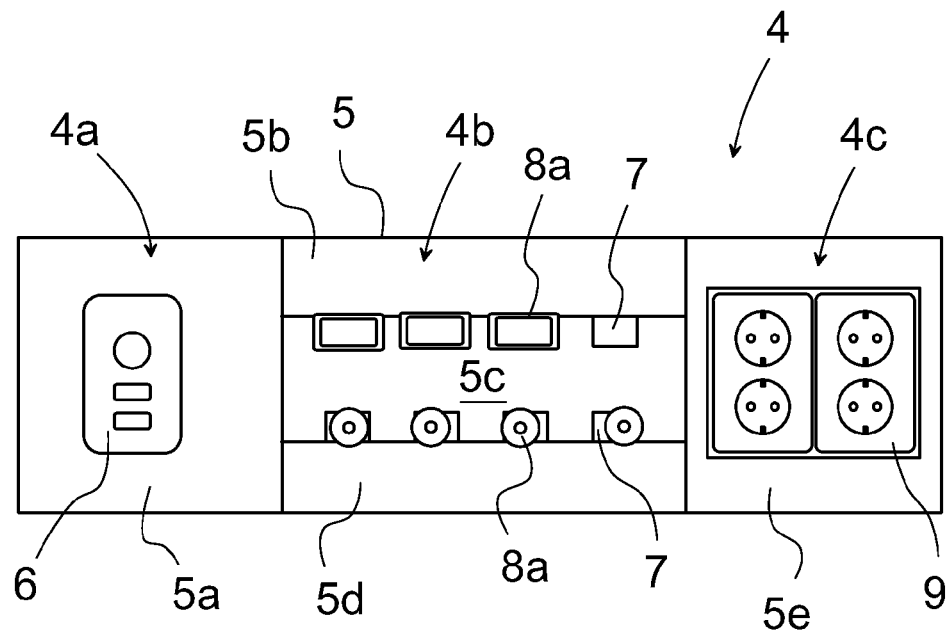
Figure 3:
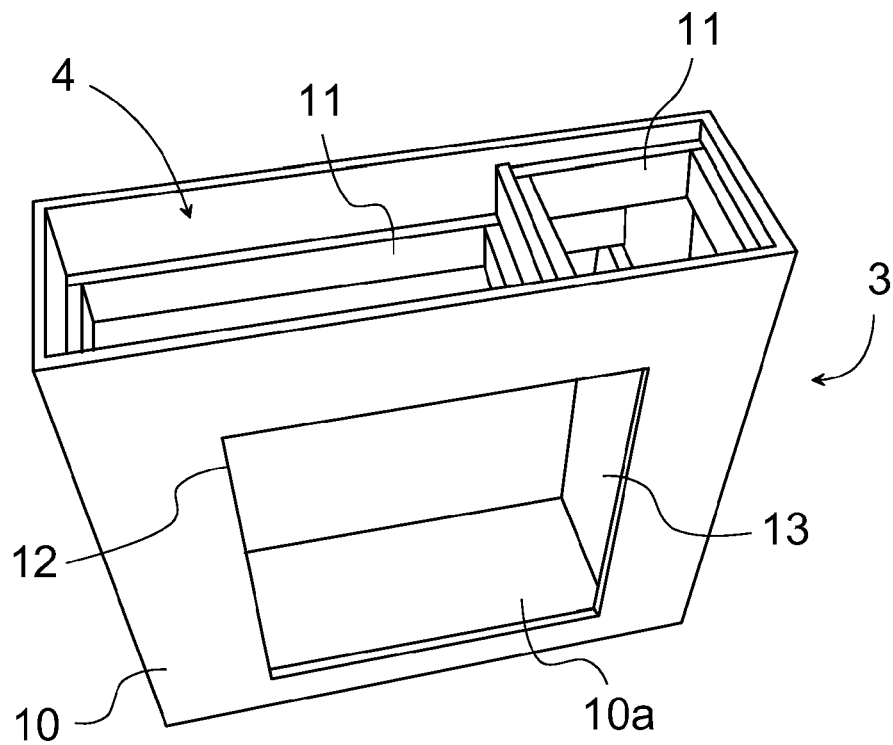
Figure 4:
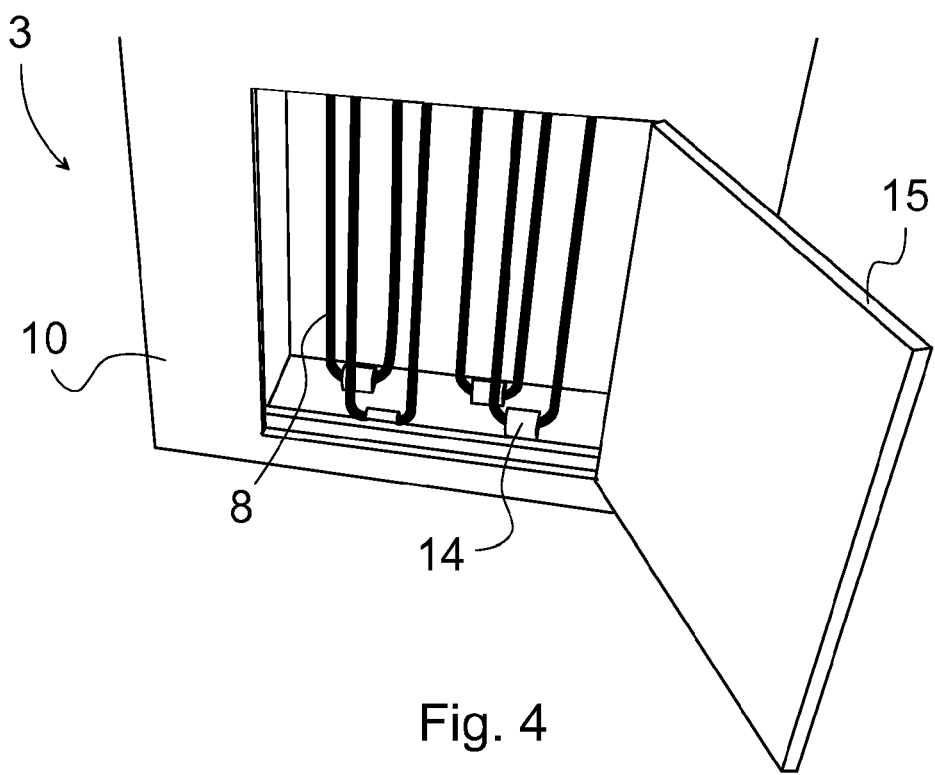
Figure 5:
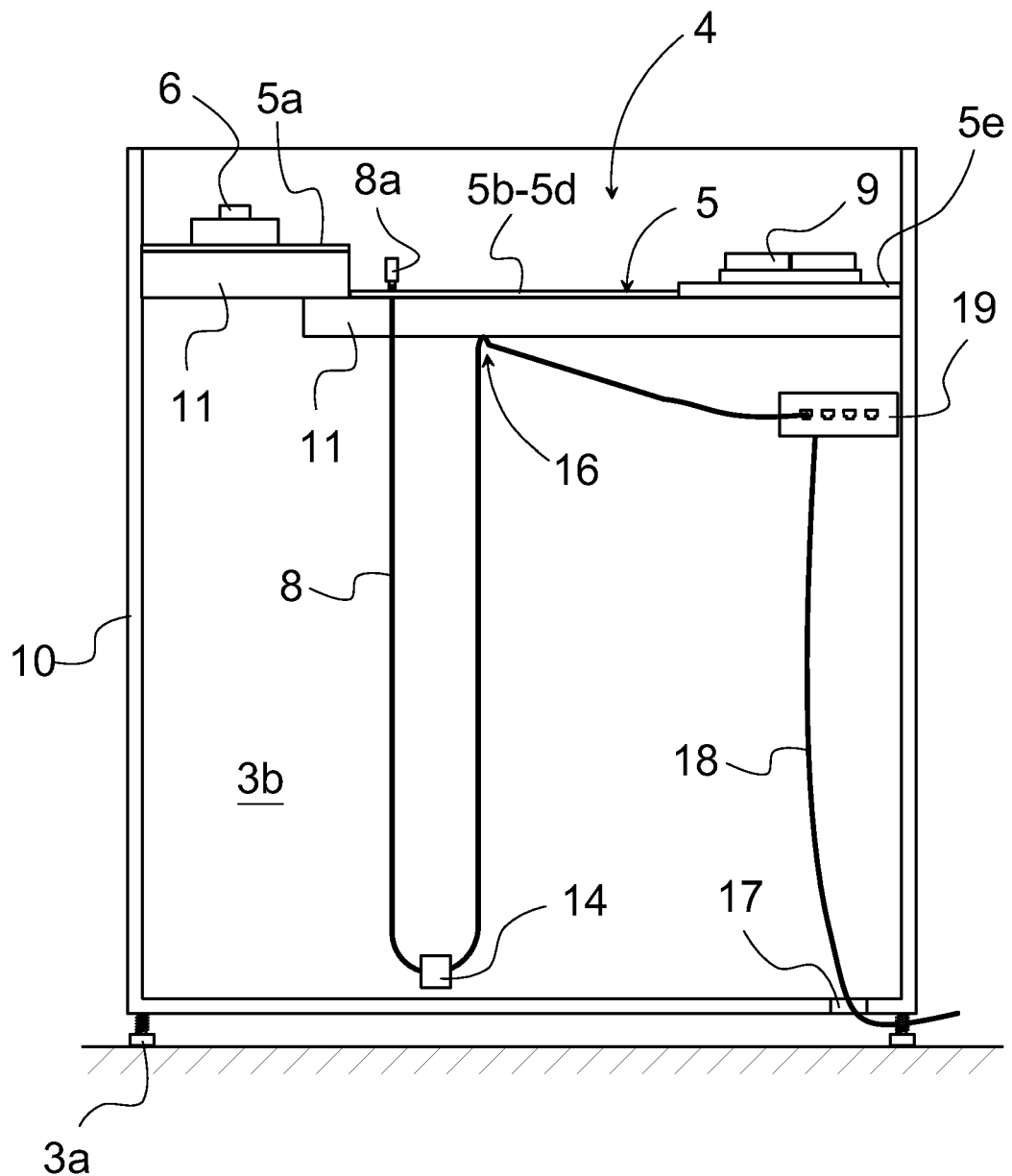
Figure 6:
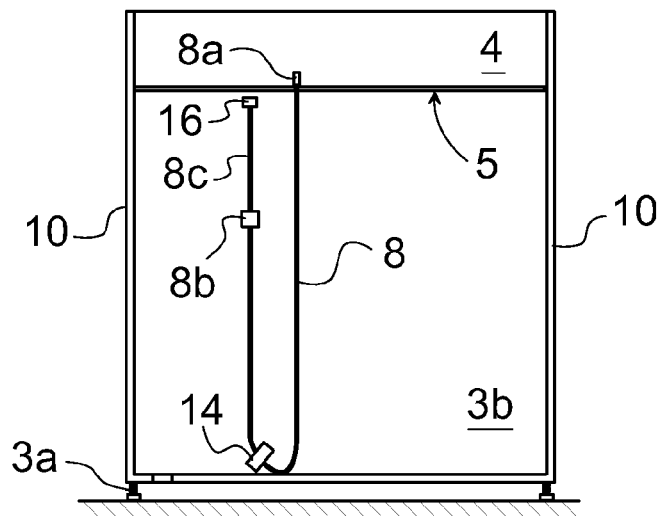
Figures 7, 8:
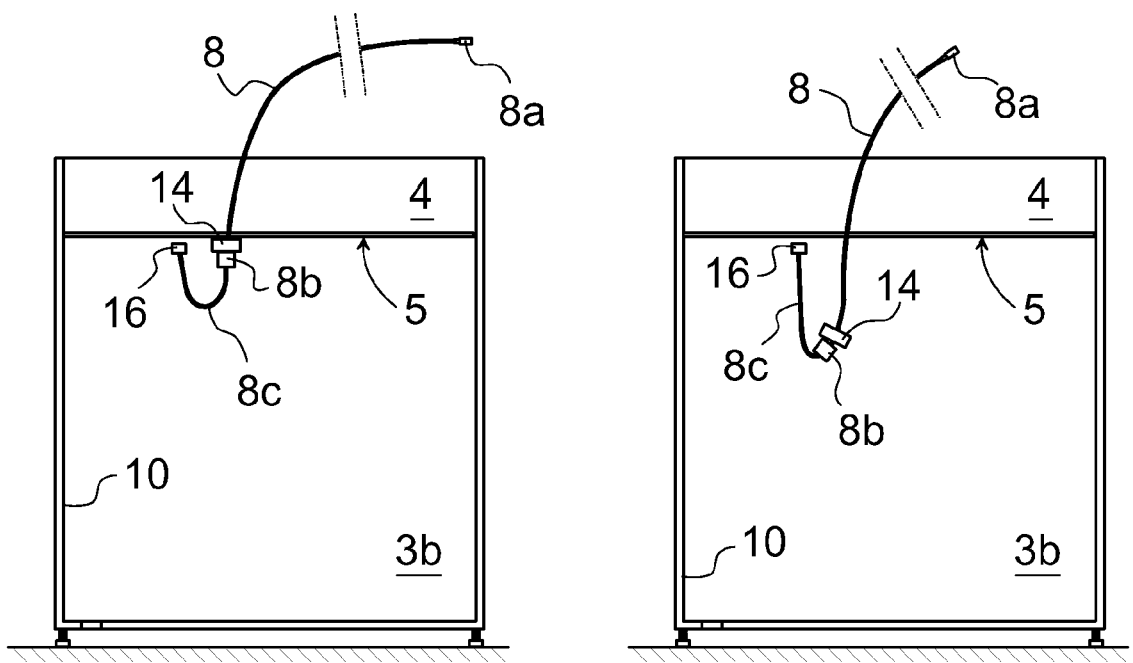

In the following, the invention will be described in detail by the aid of one example of its embodiment with reference to the attached drawings, wherein FIG. 1 presents an oblique top view of one conference table, which is provided with a table junction box according to the invention, FIG. 2 presents a top view of one interface unit according to the invention in the top part of the table junction box, FIG. 3 presents an oblique top view of a part, which is below the table, of one table junction box, FIG. 4 presents an oblique side view of one part, which is below the table, of the table junction box according to the invention, with the side cover opened, FIG. 5 presents a simplified side view, with one wall removed, of one part, which is below the table, of the table junction box according to the invention, FIG. 6 presents a simplified side view, with one wall of the casing removed, of one second preferred suspension according to the invention of a cable into the casing of the table junction box when the cable is in the position of rest, FIG. 7 presents a side view of the solution according to FIG. 6 with the cable pulled out as far as possible, and FIG. 8 presents a side view of the solution according to FIG. 6 when the cable is being returned back into the casing of the table junction box.

The table junction box 2 according to the invention works as a compatible connection point to power cables, network cables and AV cables, as well as to their controllers, for a number of conference tables made by different manufacturers and fits, by the aid of adaptor pieces 5a-5e, as a table junction box solution in connection with the most commonly used table hatch solutions. All the connection points and control points needed in a conference table and in a meeting room are easily found from the furnishing. The furnishing according to the invention also solves the problems of the builder or designer of a conference room with regard to the necessary interfaces. The junction box can be assembled and pre-installed at the factory and it can be offered as a standard fitting, in which case it contains adequate connections in almost all cases.

In this way a premanufactured table junction box 2 speeds up the installation of the furniture in the place of use and the installation work is much easier to do in good ergonomic conditions at the factory. The invention at the same time solves how cables are brought to the junction box of a conference table 1. The casing 3 disposed under the table 1, preferably detached from the bottom surface of the table, is a box, the bottom edge of which is generally close to the floor, and the casing 3 contains at least one cable channel for carrying the cables 8 to the visible part under the hatches of the junction box.

FIG. 1 presents an oblique top view of one conference table 1, which is provided with a table junction box 2 according to the invention, which comprises at least an essentially enclosed casing 3 disposed below the bottom surface of the table 1 at the point of the table hatch 2a, the height of which casing is fitted to be such that the bottom edge of the casing is near the floor. The casing 3 stands independently on the floor and its bottom edge rests on the floor by the aid of support means 3a that are adjustable in their height, by means of which the top edge of the casing 3 is adjustable to as close as possible to the bottom surface of the table 1 but, however, preferably fully detached from the bottom surface of the table 1. The support means are e.g. support legs or wheels provided with a screw thread. If necessary, the casing 3 can be suitably supported from its top edge, e.g. in the lateral direction to the bottom surface of the table 1, so that the casing 3 is not able to shift or fall when the table is moved or the casing is nudged. However, in this case it is preferred that the weight of the casing 3 does not stress the table 1, so the casing 3 is not fixed permanently to the bottom surface of the table 1. An existing shallow box or trough under the table can be replaced with the casing according to the invention.

FIG. 2 presents a top view of one interface unit of a table junction box 2, which is below the table hatch 2a in the installed junction box and forms a space 4 that enables the connections of the table junction box 2. The base 5 of the space 4 is composed of adaptor pieces 5a-5e of different thicknesses and of different sizes. Thus the table junction box 2 is easy to fit below table hatches of different shapes and different sizes, and the parts of the intermediate bed 5 can also be at different heights to each other, which is seen better e.g. in FIG. 5. The base 5 assembled from the adaptor pieces 5a-5e of the interface unit form an intermediate bed in the top part of the casing 3.

In this embodiment the interface unit of the table junction box 2 is divided into three different compartments 4a-4c, which can therefore be at a different height to each other.

The compartment 4a contains the control panel 6 for the AV equipment of the conference room, which control panel is disposed under the table hatch 2a so that it does not take up table space but, however, so that it is easily available to a user. Correspondingly, the compartment 4b contains the different connecting cables needed by users, of which only the connectors 8a at the ends of the cables can be seen, which connectors are brought to above the adaptor pieces 5b-5d via the lead-in apertures 7 in the adaptor pieces. The lead-in apertures 7 are dimensioned in terms of their size so that the cables themselves easily fit through them, but the connectors 8a at the ends of the cables do not fit through, in which case the connectors 8a are supported on the top surface of the adaptor pieces 5b-5d. In this case the cross-sectional size of the lead-in apertures 7 is greater than the diameter of the connecting cables 8, but smaller than the cross-sectional size of the connectors 8a that are at the end of the connecting cables 8. Each lead-in aperture 7 is beveled from the top so that the cable 8 would slide back into its position as well as possible when the cable 8 is left free.

The lead-in apertures 7 of the adaptor pieces are made in the edge of one or more adaptor piece 5a-5e so that at least one side of the aperture is open and unites with the edge of the adaptor piece 5a-5e. In this case in the final assembly the rectangular aperture 7 can be either a full aperture or a half aperture on the edge of the adaptor piece 5a-5e, the side of which aperture on the edge side is open and in the final assembly a round aperture 7 can on the edge of the adaptor piece 5a-5e be a semicircular aperture or only a ¼-circle or ¾-circle aperture 7, of which the side on the edge side is open. When the adaptor pieces 5a-5e are placed into their positions with their edges against each other the lead-in apertures 7 form their final size and shape. Thus, for example, in the solution according to FIG. 2, both the side edges of the adaptor piece 5c contain rectangularly-shaped lead-in apertures 7 of the size of the final assembly, the sides of which apertures on the edge side are open. When the adaptor piece 5c is placed into its position in the assembly phase of the table junction box 2, the cables 8 can be put into the lead-in apertures 7 from their open edges so that the end 8a of the cables 8 stays above the adaptor piece 5c. The lead-in apertures 7 are closed after this with the adaptor pieces 5b and 5d, the side edges of which are straight and close the lead-in apertures 7 so that the ends 8a of the cables do not fit to fall through the lead-in apertures 7.

The compartment 4b in the interface unit of the table junction box 2 contains ready connectors 8a for, depending on the need, e.g. connecting a local area network, video devices and audio devices. In the same connection there can also be other suitable connectors, e.g. USB connectors, to which a USB cable or memory stick can be connected. The compartment 4c on the right-hand side contains a plurality of plug sockets 9 for the current supply of the devices to be used in the conference room. The plug sockets 9 are fixed to the adaptor piece 5e in the interface unit.

FIG. 3 presents an oblique top view of a casing 3 of one table junction box 2 according to the invention. The casing 3 is a rectangular enclosure that is open at the top and provided with side walls 10 and a base 10a, which enclosure can if necessary be divided with vertical partitioning walls 13 into different parts. The top part of the casing 3 contains an internal support structure 11, the top surface of which at different points of the casing 3 is, if necessary, in some areas at a different height. In the solution of the embodiment, the top surface of the support structure on the right is higher than the top surface of the support structure on the left. The aforementioned adaptor pieces 5a-5f are disposed on top of the support structure 11 to be the base 5 of the upper part of the casing, i.e. of the space that enables connections 4. The wider side wall of the casing 3 contains an aperture 12 provided with an openable and closable hatch 15, via which aperture the equipment to be installed into the casing 3 can be connected and disposed into its correct position. In addition, the narrower side walls of the casing 3 can contain apertures provided with openable and closable hatches, so that there is access to the end spaces separated with partitioning walls.

FIGS. 4 and 5 present how the connecting cables 8 with the counterweight that functions as a tensioning means 14 is fitted into the casing 3. One way to dispose e.g. network cables that function as connecting cables 8 in the casing 3 is such that only one network cable 18 is brought into the casing 3 via a lead-in 17 in the base of the casing, which network cable is connected to a device, e.g. a hub, a switch or a router, that is a divider 19 in the casing 3, from where a plurality of connecting cables 8 goes onwards to the space in the top part of the casing 3. For the sake of clarity, only one connecting cable 8 is presented in FIG. 5, and the figure is also otherwise simplified. After the divider 19, the connecting cables 8 are fixed to a fixing location 16, according to the purpose in relation to the placement of the cable inside the casing 3, in the top part of the casing 3 below the intermediate bed 5, are guided after the fixing downwards to the bottom part of the casing 3, where the counterweight 14 that functions as a tensioning means and that is disposed on the connecting cable 8 pulls the connecting cable 8 downwards until taut, and finally the connecting cable 8 is guided upwards to the top part of the casing 3 and through the apertures 7 of the adaptor pieces 5b-5d to above the adaptor pieces 5b-5d such that each connector 8a of a connecting cable 8 rests on the top surface of the adaptor pieces 5b-5d pulled by the counterweight 14. Thus the connecting cable 8 forms a downward-pointing loop, at the bottom end of which is a counterweight 14. The counterweight 14 slides in relation to the connecting cable 8 in the longitudinal direction of the connecting cable 8 and is fitted to pull the part of the connecting cable 8 that is above the adaptor pieces 5b-5d back inside the casing into the space 3b below the intermediate bed 5 when the connector 8a of the connecting cable 8 is released to be free. Only the connector 8a remains above the adaptor pieces 5b-5d in the space 4 that enables connections.

FIGS. 6-8 present a second preferred method according to the invention of fitting the connecting cables 8 with their counterweights 14 into the casing 3. In this solution a special arresting means 8b is fixed, immovably in relation to the cable 8, to the cables 8 in the casing 3 of the table junction box 2 at a suitable distance towards the counterweight 14 from the fixing point 16 of the cables 8. The arresting means 8b is thus fixed between the counterweight 14 and the fixing point 16 of the cable and the part of the cable between the arresting means 8b and the fixing point 16 of the cable is marked with the reference number 8c. The length of the part 8c of the cable is suitably e.g. approx. one-third of the height of the inside space 3b of the casing 3. The purpose of the arresting means 8b is to pull the counterweight 14 on the cable 8 against the bottom surface of the adaptor pieces 5a-5e that function as an intermediate bed 5 of the junction box, or at least to so high that the freely hanging loop formed from the part 8c of the cable remains partly below the arresting means 8b and the counterweight 14 pushes the arresting means 8b downwards. In this case the arresting means 8b supports the counterweight 14 and keeps the counterweight 14 above the lowermost point of the cable 8 when the cable 8 is pulled out of the casing 3.

When the cable 8 pulled out of the casing 3 in this type of structure is released from the device to which it was connected and released to fall back into the casing 3, there is a freely hanging part 8c of cable inside the casing to the extent that the counterweight 14 is able to fall easily downwards into the casing 3 immediately at the start of the release and at the same time to pull the cable 8 that is outside the casing 3 back into its position better. The arresting means 8b thus prevents the cable 8 from being pulled out of the casing 3 for fully all its whole length, but instead the part 8c of the cable stays loose below the intermediate bed 5. Without the loose part 8c, it could happen that the cable 8 does not always fall down into the casing 3 even if the cable 8 is released.

When a user of a conference room opens the table hatch 2a, the connecting cables 8 with their connectors 8a are in neat order and the connectors 8a are the only visible traces of the previous user. When the user of the conference room stops, on the other hand, and detaches the connecting cables he/she connected, the connecting cables 8 withdraw back into the inside space 3b of the casing 3 by means of the counterweight 14, and only the connectors 8a remain in sight above the intermediate bed 5.

In addition to a divider 19, also e.g. a digital adaptor and other devices needed in a conference room can be integrated into the casing 3. The casing also contains power sockets dedicated to devices integrated into the casing, so that separate extension leads are not needed for them. In this case they do not need their own separate equipment or location position on the table.

It is obvious to the person skilled in the art that different embodiments of the invention are not limited to the example described above, but that they may be varied within the scope of the claims presented below. Thus, for example, the cable interface furniture, i.e. the table junction box, can be different in its outfitting, shape and structure to what is presented above. The main idea of the invention is enabling the connections and couplings needed in a conference room as well as the concealment of connecting leads and the prevention of them becoming entangled with each other.

It is further obvious to the person skilled in the art that, instead of the counterweight structure used, the connecting cables can be kept taut and be pulled back also in other ways than with a counterweight, e.g. by means of a spring.

It is also obvious to the person skilled in the art that the leads and cables coming into the casing of the table junction box can be taken inside the casing from elsewhere than the base of the casing, e.g. from the sides or ends of the casing and either from the bottom part or from the top part of the casing.

It is also obvious to the person skilled in the art that the table junction box can also be tailored, e.g. by hand or to be compatible with tables manufactured of solid wood and with their hatch solutions.

It is further obvious to the person skilled in the art that the connectors of the connecting cables can be supported in the top part of the casing otherwise than against the intermediate bed of the top part. The side walls of the top part of the casing can comprise e.g. separate supports that are at a suitable height and that extend suitably inwards from the side walls.

In addition, it is obvious to the person skilled in the art that the one connecting cable coming into the casing does not necessarily need to be divided into a number of cables, but instead a plurality of network cables can come into the casing all the way from the cross-connection, each of which is guided inside the casing via its fixing point in the top part of the casing to the counterweight in the bottom part of the casing and from there upwards through the intermediate bed to the space that enables connections above intermediate bed.

The invention claimed is:

1. Cable interface furniture for a conference table, which cable interface furniture comprises at least a space that enables connections and that is disposable below an openable and closable table hatch in the table wherein, the cable interface furniture comprises a casing extending from the bottom upwards that is intended to be placed under the table and that stands on the floor resting on supports that are adjustable in their height, the top part of which contains an intermediate bed provided with lead-in apertures, above which bed is a space enabling connections, with at least the connectors of the connecting cables being supported in which bed, and which connecting cables except for the connectors are fitted when free to be disposed in the casing in the space below the intermediate bed.

2. Cable interface furniture according to claim 1, wherein the cable interface furniture is a free-standing furnishing between the bottom surface of the table and the floor that rests on its own support and is suited to be a separate unit independently standing on the floor.

3. Cable interface furniture according to claim 2, wherein the cable interface furniture comprises one or more adaptor pieces that form the base of the space that enables connections and that are adjustable in their width and/or length and/or height, by which adaptor piece(s) the cable interface furniture can be fitted in connection with the table hatch of the table.

4. Cable interface furniture according to claim 3, wherein at least a part of the adaptor pieces contain lead-in apertures for the lead-ins of the connecting cables.

5. Cable interface furniture according to claim 1 or 2, wherein the cable interface furniture is assembled and basically equipped at the factory to be a finished furnishing unit comprising at least a plurality of internal cables of the cable interface furniture, connectors and different actuators.

6. Cable interface furniture according to claim 5, wherein the cable interface furniture comprises one or more adaptor pieces that form the base of the space that enables connections and that are adjustable in their width and/or length and/or height, by which adaptor piece(s) the cable interface furniture can be fitted in connection with the table hatch of the table.

7. Cable interface furniture according to claim 6, wherein at least a part of the adaptor pieces contain lead-in apertures for the lead-ins of the connecting cables.

8. Cable interface furniture according to claim 1, wherein the cable interface furniture comprises one or more adaptor pieces that form the base of the space that enables connections and that are adjustable in their width and/or length and/or height, by which adaptor piece(s) the cable interface furniture can be fitted in connection with the table hatch of the table.

9. Cable interface furniture according to claim 8, wherein at least a part of the adaptor pieces contain lead-in apertures for the lead-ins of the connecting cables.

10. Cable interface furniture according to claim 8, wherein at least a part of the adaptor pieces contain lead-in apertures for the lead-ins of the connecting cables.

11. Cable interface furniture according to claim 1, wherein the cross-sectional size of the lead-in apertures is greater than the diameter of the connecting cables, but smaller than the cross-sectional size of the connectors that are at the end of the connecting cables.

12. Cable interface furniture according to claim 8, wherein the intermediate bed is fitted to support by the adaptor pieces at least the connectors of the connecting cables.

13. Cable interface furniture according to claim 1, wherein the casing contains a tensioner connected to each connecting cable, which tensioner is fitted to keep the part of the connecting cable on the side of the connector taut and to pull the connectors against the top surface of the intermediate bed.

14. Cable interface furniture according to claim 13, wherein the tensioner is a counterweight that is disposed on each connecting cable and that moves in relation to the connecting cable.

15. Cable interface furniture according to claim 13, wherein an arrester is fixed to the connecting cable between the tensioner and the fixing point of the connecting cable for supporting the tensioner and for keeping it above the lowermost point of the cable when the cable is pulled out of the casing.

16. Cable interface furniture according to claim 1, wherein at least one wall of the casing contains an aperture for installing equipment inside the casing.

17. Cable interface furniture according to claim 1, wherein, in addition to the connectors of the connecting cables, at least an AV control panel and one or more plug sockets that enable the supply of electricity are above the bed in the space that enables connections and above the adaptor pieces.

18. Cable interface furniture according to claim 1, wherein the top of the casing is uncovered.

19. Cable interface furniture intended to be placed under a table, which cable interface furniture comprises at least a casing extending from the bottom upwards that is intended to be placed under the table; supports that are adjustable in their height for supporting the cable interface furniture; a space that enables connections and that is disposable below the table; one or more connecting cables having at least a connector at one end of the connecting cable, wherein a top part of the casing contains an intermediate bed provided with at least one lead-in aperture for said at least one connecting cable and dividing the casing into a first space above the intermediate bed and a second space below the intermediate bed, said intermediate bed providing support for the connectors of the at least one connecting cable, and which at least one connecting cable except for the connector is fitted when free to be disposed in the casing in the second space below the intermediate bed.

* * * * *